United States Patent
Yamanaka

(10) Patent No.: US 7,441,576 B2
(45) Date of Patent: Oct. 28, 2008

(54) PNEUMATIC TIRE

(75) Inventor: Takaya Yamanaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 254 days.

(21) Appl. No.: 10/558,254

(22) PCT Filed: May 18, 2004

(86) PCT No.: PCT/JP2004/006647

§ 371 (c)(1),
(2), (4) Date: Nov. 21, 2005

(87) PCT Pub. No.: WO2004/103736

PCT Pub. Date: Dec. 2, 2004

(65) Prior Publication Data

US 2007/0056672 A1    Mar. 15, 2007

(30) Foreign Application Priority Data

May 21, 2003   (JP) .............................. 2003-143047

(51) Int. Cl.
*B60C 9/22* (2006.01)
*B60C 9/20* (2006.01)
*B60C 9/18* (2006.01)

(52) U.S. Cl. ................... 152/527; 152/531; 152/532; 152/533; 152/538

(58) Field of Classification Search ............. 152/531, 152/533, 538, 527
See application file for complete search history.

(56) References Cited

U.S. PATENT DOCUMENTS 5,383,507 A * 1/1995 Sato et al. ................... 152/527
6,959,746 B2 * 11/2005 Shimizu
2005/0000617 A1 * 1/2005 Tsuruta ........................ 152/531

FOREIGN PATENT DOCUMENTS

| EP | 0 511 797 A1 | 11/1992 |
|---|---|---|
| EP | 1 403 096 A1 | 3/2004 |
| EP | 1 454 766 A1 | 9/2004 |
| JP | 4-328003 A | 11/1992 |
| JP | 2001-191725 A | 7/2001 |
| JP | 2002-254903 A | 9/2002 |
| JP | 2003-154808 A | 5/2003 |
| JP | 2004-83001 A | 3/2004 |
| WO | WO 02/074560 A1 | 9/2002 |
| WO | 03/043837 A1 | 5/2003 |

* cited by examiner

*Primary Examiner*—Adrienne C Johnstone
(74) *Attorney, Agent, or Firm*—Sughrue Mion, PLLC

(57) ABSTRACT

A pneumatic tire comprises a carcass 1 comprised of one or more carcass plies toroidally extending between a pair of bead portions, a tread rubber 2 arranged at an outer peripheral side of a crown portion of the carcass 1, a belt 5 arranged between the tread rubber 2 and the carcass 1 and comprised of two belt layers 3, 4, cords 10 of which layers being crossed with each other and extending in an inclination angle of 45-80° with respect to a circumferential direction of the tire, and one or more circumferential strengthening layers 6, 7 arranged at an inner peripheral side of the belt 5 and containing wavy or zigzag cords 9 extended substantially in the circumferential direction of the tire, in which a width L of a belt layer 7 located at the inner peripheral side is made larger than a width M of the circumferential strengthening layer and a width N of a belt layer located at the outer peripheral side is made smaller than the width M of the circumferential strengthening layer.

3 Claims, 2 Drawing Sheets

PNEUMATIC TIRE

TECHNICAL FIELD

This invention relates to a pneumatic tire having improved durability and resistance to uneven wear and mainly suitable for heavy duty vehicles such as truck, bus and the like.

BACKGROUND ART

In the heavy duty pneumatic tire, a belt is generally arranged on an outer peripheral side of a crown portion of a carcass for strengthening a tread portion. As the belt is mainly used a cross belt comprised of plural belt layers, cords of which layers being crossed with each other, or a slant belt comprised of one belt layer containing cords inclined in one direction with respect to a circumferential direction of the tire.

When an air pressure is filled in such a pneumatic tire, the hoop effect of the belt becomes smaller in a shoulder portion of the tread positioning cut ends of the belt cords than a central portion of the tread, so that the size growing amount of the belt at the tread shoulder portion becomes larger than that at the tread central portion. As a result, a portion of a tread rubber corresponding to the tread shoulder portion is deformed so as to relatively largely increase the size as compared with the other portion, and there is a problem that separation failure is easily caused between the belt and the tread rubber.

In tires having an aspect ratio of not more than 60%, the size growing amount of the belt particularly tends to become larger in the tread shoulder portion.

As a countermeasure for suppressing the size growth of the belt in the tread shoulder portion, it is proposed and used to arrange a circumferential strengthening layer containing wavy or zigzag cords extended in the circumferential direction at an inner peripheral side or an outer peripheral side of the belt or between the belt layers. In this case, the size growing amount of the belt in the tread shoulder portion can be suppressed to prevent the separation failure and improve the durability in the tread shoulder portion.

In the tire having the above construction, however, there is caused a new problem that since the bending rigidity of the circumferential strengthening layer in a widthwise section is small though the separation failure resulted from the size growth of the belt in the filling of the internal pressure can be suppressed, if the tire rides on a projection such as stones or the like during the running, the belt and the circumferential strengthening layer are deformed so as to make a recess with a deep inclination angle with respect to the widthwise direction starting from a position of a side edge of the circumferential strengthening layer and hence widthwise shearing strain produced in the belt increases and strain and stress are concentrated to the side edge of the belt to generate a separation failure.

In order to solve this problem, JP-A-2000-62411 proposes a pneumatic tire in which the circumferential strengthening layer is arranged at the inner peripheral side of the belt and a belt reinforcing layer having a width wider than that of the circumferential strengthening layer is arranged at the outer peripheral side of the belt and the cord angle of the belt reinforcing layer with respect to the circumferential direction of the tire is made larger than the inclination cord angle of the belt with respect to the circumferential direction of the tire.

According to this proposal, the belt reinforcing layer largely contributes to increase the bending rigidity in the widthwise section of the tire, so that even if the tire rides on the projection such as stones or the like during the running, the displacements of the belt and the circumferential strengthening layer at the position ride on the projection inward in the radial direction are made small and the starting point of the deformation is moved up to the side edge of the belt reinforcing layer, whereby the distortion deformation of the belt and the circumferential strengthening layer can be made at a shallow inclination angle with respect to the widthwise direction. Thus, the widthwise shearing strain produced in the belt can be suppressed to prevent the separation failure resulting from the concentration of strain and stress to side edge of the belt.

In such a tire, however, there is a problem that the weight of the tire as a whole is too large because the circumferential strengthening layer is arranged at the inner peripheral side of the belt and further the belt reinforcing layer is arranged at the outer peripheral side of the belt. Also, it is necessary to consider the separation failure between the belt and the belt reinforcing layer in accordance with the further reduction of the aspect ratio in recent tires.

The invention is to solve the above problems of the conventional techniques and to provide a heavy duty pneumatic tire capable of preventing the deterioration of the durability at the position of the widthwise side edge of the belt without increasing the weight of the tire as a whole in the structure having an arrangement of the strengthening layer for enhancing the rigidity in the circumferential direction and even in a tire having a low aspect ratio.

DISCLOSURE OF THE INVENTION

According to the invention, there is the provision of a pneumatic tire comprising a carcass comprised of one or more carcass plies toroidally extending between a pair of bead portions, a tread rubber arranged at an outer peripheral side of a crown portion of the carcass, a belt arranged between the tread rubber and the carcass and comprised of two belt layers, cords of which layers being crossed with each other and extending in an inclination angle of 45-80° with respect to a circumferential direction of the tire, and one or more circumferential strengthening layers arranged at an inner peripheral side of the belt and containing wavy or zigzag cords extended substantially in the circumferential direction of the tire, in which a width of a belt layer located at the inner peripheral side is made larger than a width of the circumferential strengthening layer and a width of a belt layer located at the outer peripheral side is made smaller than the width of the circumferential strengthening layer.

As previously mentioned, when the tire having the circumferential strengthening layer rides on the projection such as stones or the like during the running, since the bending rigidity of the circumferential strengthening layer in the widthwise direction is small, the belt and the circumferential strengthening layer are largely deformed in a concave form starting from the side edge of the circumferential strengthening layer, and as a result, the widthwise shearing strain produced in the belt becomes large and there is a problem that separation failure is easily caused at each end of the belt.

According to the invention, since the cords of the belt layers have a high inclination angle of 45-80° with respect to the circumferential direction of the tire, a high bending rigidity can be developed in a widthwise section of the belt layers themselves, so that the displacement in the riding on the projection is suppressed and the starting point of the deformation is moved up to the side edge of the belt layer located at the inner peripheral side, whereby the inclination angle accompanied with the deformation of the belt layers can be made low and the widthwise shearing strain generated in the belt layers can be made small to prevent the separation failure at the end of the belt.

In addition, the function of enhancing the bending rigidity in the widthwise section is given to the belt layers themselves, whereby the separation failure at the side end of the belt can be prevented without increasing the weight of the tire as a whole as compared with the tire having the belt reinforcing layer arranged at the outer peripheral side of the belt and containing cords inclined at a high angle with respect to the circumferential direction of the tire.

Also, the width of the belt layer located at the outer peripheral side is made narrower than the width of the circumferential strengthening layer, whereby the function of protecting the belt layer located at the inner peripheral side is kept without causing the increase of the tire weight as a whole and the side edge of the belt layer located at the outer peripheral side is separated apart from the side edge of the belt layer located at the inner peripheral side, and hence the separation failure caused between the side ends of the belt layers can be prevented.

When the angle of the cord in the belt layer with respect to the circumferential direction of the tire is less than 45°, the effect of enhancing the bending rigidity in the widthwise direction of the tire is small, while when it exceeds 80°, the effect of preventing the occurrence of separation failure at the belt end is insufficient.

In a preferable embodiment of the invention, the width of the circumferential strengthening layer is 60-80% of a tire section width, and the width of the belt layer located at the inner peripheral side is 80-90% of the tire section width, and the width of the belt layer located at the outer peripheral side is 20-50% of the tire section width.

According to this embodiment, specifications adaptable for an actual product can be defined in the pneumatic tire considering results of actual running test and indoor test.

When the width of the circumferential strengthening layer is less than 60% of the tire section width, the effect of suppressing the size growing amount of the tire in the filling of the air pressure becomes small, while when it exceeds 80%, the side edge of the circumferential strengthening layer can not be sufficiently separated apart form the side end of the belt layer located at the inner peripheral side and the effect of preventing the separation failure at the side end of the belt layer becomes small.

When the width of the belt layer located at the inner peripheral side is less than 80% of the tire section width, the effect of suppressing the lowering of the bending rigidity in the widthwise direction of the tire resulted from the arrangement of the circumferential strengthening layer to prevent the separation failure at the side edge of the circumferential strengthening layer becomes small and also the effect of preventing the uneven wear of the tread shoulder portion becomes small. While, when the width of the belt layer located at the inner peripheral side exceeds 90% of the tire section width, since it is required to curve the belt layer along the curved portion of the tread shoulder portion, there is a fear of causing the inferior production, and if cut failure is caused in a buttress portion, there is a fear of exposing the belt to easily cause troubles.

When the width of the belt layer located at the outer peripheral side is less than 20% of the tire section width, the effect of protecting the belt layer located at the inner peripheral side, while when it exceeds 50%, the extra increase of the weight is caused and the side end of the belt layer located at the outer peripheral side approaches to the side end of the belt layer located at the inner peripheral side to easily cause the separation failure between side ends of the inner and outer belt layers.

In another preferable embodiment of the invention, a cushion rubber layer having a thickness of 0.5-2.5 mm is arranged between the side end of the circumferential strengthening layer and the belt layer located at the inner peripheral side.

In general, the shearing strain is caused between the side end of the circumferential strengthening layer and the belt layer due to the difference between the cord angles of these layers with respect to the circumferential direction of the tire to easily cause the separation failure. According to the invention, a proper space can be kept between the side end portion of the circumferential strengthening layer and the belt layer to prevent the separation failure caused between these layers.

When the thickness of the cushion rubber layer is less than 0.5 mm, the effect of preventing the separation failure becomes small and the production is difficult, while when it exceeds 2.5 mm, a portion of the belt layer arranging the cushion rubber layer is lifted up toward the outer peripheral side and the tread rubber corresponding to such a portion should be made thin, and as result, if cut failure is caused on the surface of the tread, there is caused a problem that the cut failure is apt to easily arrive at the belt layer.

In the other preferable embodiment of the invention, the width of the belt layer located at the inner peripheral side is 85-105% of a treading face width.

In this case, the effect of suppressing the uneven wear of the tread shoulder portion by the belt layer located at the inner peripheral side can be guaranteed more surely. When the width of the belt layer located at the inner peripheral side is less than 85% of the treading face width, the effect of suppressing the uneven wear becomes small, while when it exceeds 105%, since it is required to curve the belt layer along the curved portion of the tread shoulder portion, there is a fear of causing the inferior production, and if cut failure is caused in a buttress portion, there is a fear of exposing the belt to easily cause troubles.

BEST MODE FOR CARRYING OUT THE INVENTION

An embodiment of the invention will be described with reference to the accompanying drawings below.

Figure 1:
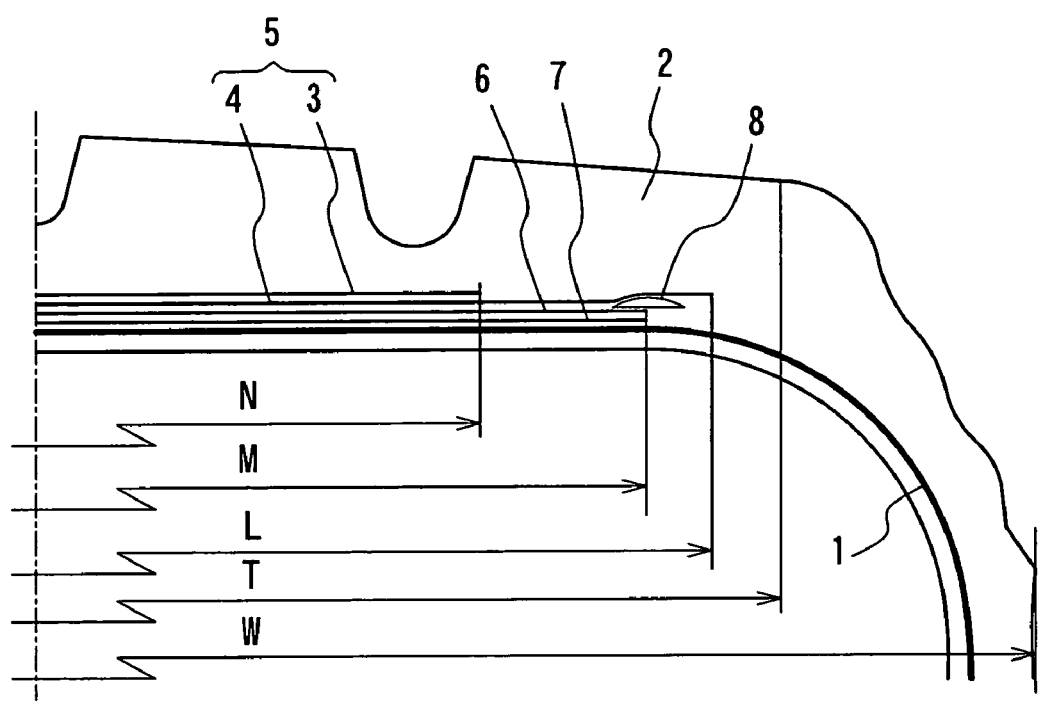
FIG. 1 is a widthwise section view of a tread portion in a half of a tire according to an embodiment of the invention.

FIG. 1 is a widthwise section view of a tread portion in a half of a tire according to an embodiment of the invention. In the figure, numeral 1 is a carcass and numeral 2 a tread rubber arranged at an outer peripheral side of a crown portion of the carcass.

A belt 5 comprised of two belt layers 3, 4 is arranged between the carcass 1 toroidally extending between bead cores not shown and the tread rubber 2, while two circumferential strengthening layers 6, 7 are arranged adjacent to an inner peripheral side of the belt 5. Preferably, a cushion rubber layer 8 having a thickness of 0.5-2.5 mm is arranged between a side end of the circumferential strengthening layer 7 and the belt layer 4.

A width L of the belt layer 4 located at the inner peripheral side is 80-90% of a tire section width W, and widths M of the circumferential strengthening layers 6, 7 are 60-80%, and a width N of the belt layer 3 located at the outer peripheral side is 20-50% of the tire section width W.

Figure 2:
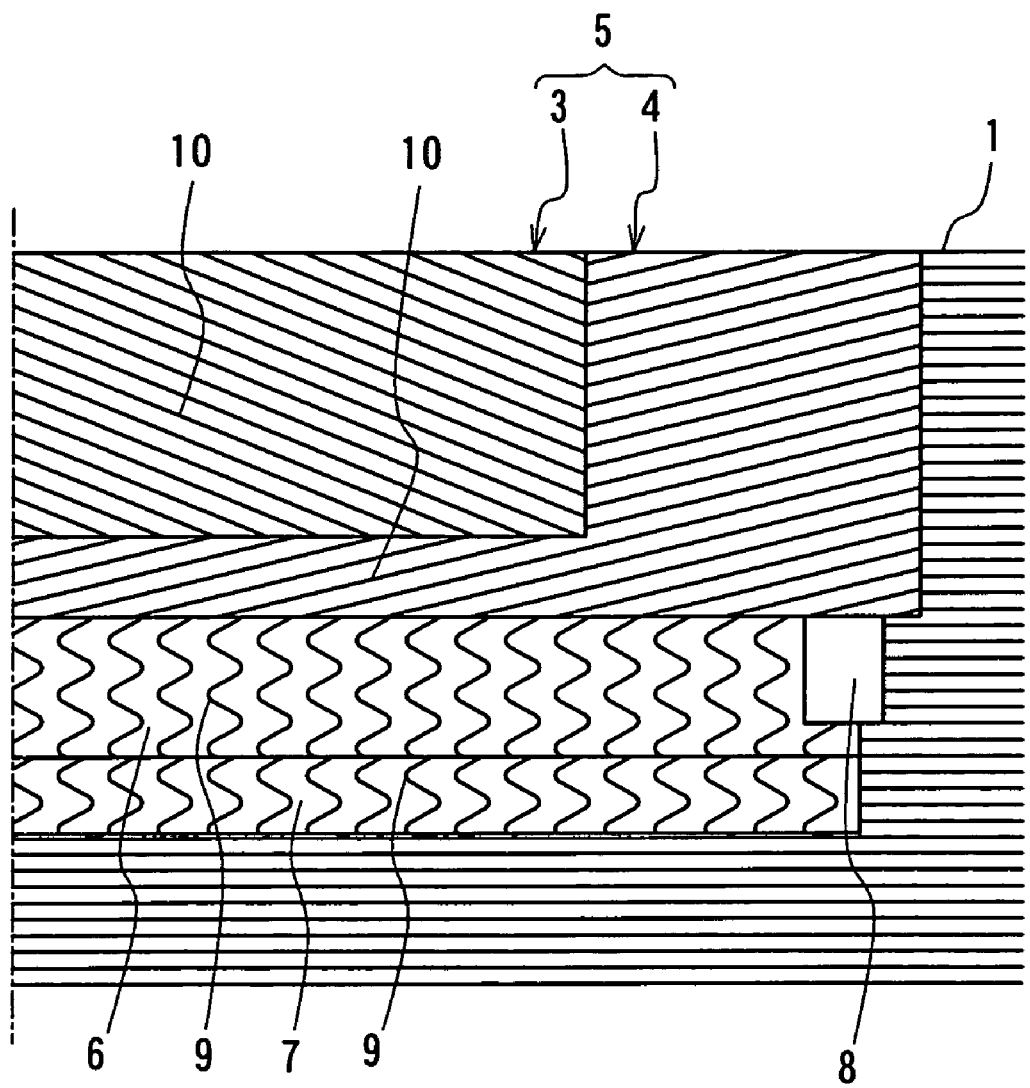
FIG. 2 is a developed view showing a reinforcing structure in a tread portion of the tire shown in FIG. 1.

FIG. 2 is a developed view showing a reinforcing structure in a tread portion of the tire shown in FIG. 1.

Each of the circumferential strengthening layers 6, 7 is formed by extending a plurality of inextensible cords 9 such as steel cords or aramide cords in a wavy or zigzag form such as triangular wave, square wave, sin wave or the like with respect to the circumferential direction of the tire at the same amplitude and period or at different phase and covering with a coating rubber.

The belt layer 3 is formed by arranging a plurality of cords 10 so as to incline at 45-80° with respect to the circumferential direction of the tire upward to the left and covering with a coating rubber, while the belt layer 4 is formed by extending a plurality of cords 10 so as to incline at the same angle as the cords 10 of the belt layer 3 with respect to the circumferential direction upward to the right and covering with a coating rubber.

According to the above construction, the separation failure at the side end of the belt layer can be prevented and the separation failure between the belt layer and the circumferential strengthening layer can be prevented without increasing the weight of the tire as a whole.

EXAMPLES

For the purpose of evaluating the belt durability and resistance to uneven wear in the heavy duty pneumatic tire according to the invention, each of heavy duty pneumatic tires with a low aspect ratio having tire sizes of 315/60 R22.5, 385/55 R22.5, 445/50 R22.5, 435/45 R22.5 and 495/40 R22.5 is mounted on the respective approved rim and filled with an air pressure of 900 kPa, which is mounted on a test vehicle and run over 100,000 km, and thereafter the presence or absence of the occurrence of crack in the belt portion and the occurrence of uneven wear in the tread shoulder portion are investigated. The results are shown in Table 1.

When the example tires 1-5 are compared with the example tire 6, the resistance to uneven wear is further excellent in the example tires 1-5 as compared with the example tire 6 in which the ratio of width of the circumferential strengthening layer to the tire section width is smaller than the lower limit of 60%.

When the example tires 1-5 are compared with the example tire 7, the cut resistance is further excellent in the example tires 1-5 as compared with the example tire 7 in which the ratio of width of the circumferential strengthening layer to the tire section width is larger than the upper limit of 80%.

When the example tires 1-5 are compared with the example tire 8, the cut resistance is further excellent in the example tires 1-5 as compared with the example tire 8 in which the thickness of the cushion rubber layer is larger than the upper limit of 2.5 mm.

When the example tires 1-5 are compared with the example tire 9, the resistance to uneven wear is further excellent in the example tires 1-5 as compared with the example tire 9 in which the ratio of width of the belt layer located at the inner peripheral side to the width of the treading face is smaller than the lower limit of 85%.

When the example tires 1-5 are compared with the example tire 10, the cut resistance is further excellent in the example tires 1-5 as compared with the example tire 10 in which the ratio of width of the belt layer located at the inner peripheral side to the width of the treading face is larger than the upper limit of 105%.

INDUSTRIAL APPLICABILITY

As seen from the above, according to the invention, the cord angle in the belt with respect to the circumferential direction of the tire is made as high as 45-80°, whereby the high bending rigidity in the widthwise section can be developed in the belt itself, so that when the tire rides on the projection, the displacement is suppressed and the starting point of the deformation is moved up to the side edge of the

TABLE 1

| | Aspect ratio (%) | Width of circumferential strengthening layer/tire section width (%) | Width of inner peripheral side belt layer/tire section width (%) | Width of outer peripheral side belt layer/tire section width (%) | Width of inner peripheral side belt layer/width of treading face (%) | Distance between circumferential strengthening layer and inner peripheral side belt layer (mm) | Belt durability (presence or absence of crack) | Resistance to uneven wear (presence or absence of uneven wear) | Cut resistance (presence or absence of cut from road surface) |
|---|---|---|---|---|---|---|---|---|---|
| Example tire 1 | 60 | 63 | 81 | 23 | 88 | 1 | absence | absence | absence |
| Example tire 2 | 55 | 75 | 85 | 38 | 102 | 1.5 | absence | absence | absence |
| Example tire 3 | 50 | 68 | 83 | 30 | 97 | 1.5 | absence | absence | absence |
| Example tire 4 | 45 | 72 | 88 | 46 | 91 | 2 | absence | absence | absence |
| Example tire 5 | 40 | 70 | 85 | 35 | 99 | 2.3 | absence | absence | absence |
| Example tire 6 | 50 | 58 | 78 | 19 | 97 | 1.5 | absence | presence | absence |
| Example tire 7 | 50 | 82 | 92 | 52 | 97 | 1.5 | absence | absence | presence |
| Example tire 8 | 50 | 68 | 83 | 30 | 97 | 2.7 | absence | absence | presence |
| Example tire 9 | 50 | 68 | 83 | 30 | 83 | 1.5 | absence | presence | absence |
| Example tire 10 | 50 | 68 | 83 | 30 | 107 | 1.5 | absence | absence | presence |
| Comparative tire | 40 | 53 | 78 | 71 | 99 | 0.5 | presence | absence | absence |

As seen from the comparison of the example tires with the comparative tire in Table 1, the occurrence of separation at the belt end is not caused in all of the example tires and the belt durability is good.

The example tires 1-5 cover all features of the invention and satisfy all performances such as belt durability, resistance to uneven wear and cut resistance.

belt layer located at the inner peripheral side to make the inclination angle accompanied with the deformation of the belt low and hence the widthwise shearing strain produced in the belt can be made small to prevent the separation failure at the belt end. In addition, the function of enhancing the bending rigidity in the widthwise section is provided in the belt itself, whereby the separation failure at the belt end can be prevented without increasing the weight of the tire as a whole as compared with the tire in which the belt reinforcing layer containing cords inclined at a high angle with respect to the circumferential direction is arranged on the outer peripheral side of the belt. Also, the width of the belt layer located at the outer peripheral side is made narrower than that of the circumferential strengthening layer, whereby the function of protecting the belt layer located at the inner peripheral side is kept without increasing the weight of the tire as a whole, and the side end of the belt layer located at the outer peripheral side can be separated apart from the side end of the belt layer located at the inner peripheral side to prevent the separation failure caused at each side end of the respective belt layers.

The invention claimed is:

1. A pneumatic tire comprising
a carcass comprised of one or more carcass plies toroidally extending between a pair of bead portions,
a tread rubber arranged at an outer peripheral side of a crown portion of the carcass,
a belt arranged between the tread rubber and the carcass and comprised of two belt layers, cords of which layers being crossed with each other and extending in an inclination angle of 45-80° with respect to a circumferential direction of the tire, and
two circumferential strengthening layers having the same width arranged at an inner peripheral side of the belt and containing wavy or zigzag cords extended substantially in the circumferential direction of the tire,
in which a width of a belt layer located at the inner peripheral side is made larger than the width of the two circumferential strengthening layers and
a width of a belt layer located at the outer peripheral side is made smaller than the width of the two circumferential strengthening layers, and
the width of each of the two circumferential strengthening layers is 60-80% of a tire section width, and
the width of the belt layer located at the inner peripheral side is 80-90% of the tire section width, and
the width of the belt layer located at the outer peripheral side is 20-50% of the tire section width.

2. A pneumatic tire according to claim 1, wherein a cushion rubber layer having a thickness of 0.5-2.5 mm is arranged between the side end of an outermost of the two circumferential strengthening layers and the belt layer located at the inner peripheral side.

3. A pneumatic tire according to claim 1, wherein the width of the belt layer located at the inner peripheral side is 85-105% of a treading face width.

* * * * *